(12) United States Patent
Peterson et al.

(10) Patent No.: US 8,199,324 B2
(45) Date of Patent: Jun. 12, 2012

(54) OPTICAL ASSEMBLIES FOR A COLOR MEASUREMENT INSTRUMENT

(75) Inventors: Steven Henry Peterson, Martin, MI (US); Harold VanAken, Wallkill, NY (US)

(73) Assignee: X-Rite, Inc., Grand Rapids, MI (US)

( * ) Notice: Subject to any disclaimer, the term of this patent is extended or adjusted under 35 U.S.C. 154(b) by 419 days.

(21) Appl. No.: 12/511,603

(22) Filed: Jul. 29, 2009

(65) Prior Publication Data

US 2011/0026021 A1    Feb. 3, 2011

(51) Int. Cl.
*G01N 21/25* (2006.01)

(52) U.S. Cl. ........ 356/407; 356/402; 356/405; 356/406; 356/420

(58) Field of Classification Search .......... 356/407, 356/420, 402, 405, 406, 416, 419; 359/589, 359/590, 634
See application file for complete search history.

(56) References Cited

U.S. PATENT DOCUMENTS

| | | | | |
|---|---|---|---|---|
| 4,838,697 A | * | 6/1989 | Kurandt | 356/406 |
| 4,878,756 A | * | 11/1989 | Stauffer | 356/406 |
| 5,768,026 A | * | 6/1998 | Kiyomoto et al. | 359/634 |
| 6,888,633 B2 | | 5/2005 | Jagt et al. | |
| 7,092,097 B2 | | 8/2006 | Cargill et al. | |
| 7,145,657 B2 | | 12/2006 | Peterson et al. | |
| 7,262,853 B2 | | 8/2007 | Peterson et al. | |
| 7,557,924 B2 | | 7/2009 | Nisper et al. | |
| 7,557,925 B2 | | 7/2009 | Nisper et al. | |

* cited by examiner

*Primary Examiner* — Layla Lauchman
(74) *Attorney, Agent, or Firm* — McCarter & English, LLP

(57) ABSTRACT

The optical assemblies disclosed herein advantageously utilize a beamsplitting apparatus in association with either (i) the illumination path or (ii) the collection path of a color measurement instrument. For implementations involving the illumination path, the beamsplitting apparatus may be configured to spectrally divide one or more initial beams of light so as to emit a plurality of resultant beams of light, wherein the optical assembly is configured to illuminate a target using at least a first and a second of the plurality of resultant beams of light. Similarly, for implementations involving the collection path, the beamsplitting apparatus may be configured to spectrally divide light received from a target so as to emit a plurality of resultant beams of light, wherein the optical assembly is configured to detect at least a first and a second of the plurality of resultant beams of light. Advantageously, each of the first and second resultant beams of light is a product of a distinct set of one or more spectral constraints exacted by the beamsplitting apparatus.

21 Claims, 4 Drawing Sheets

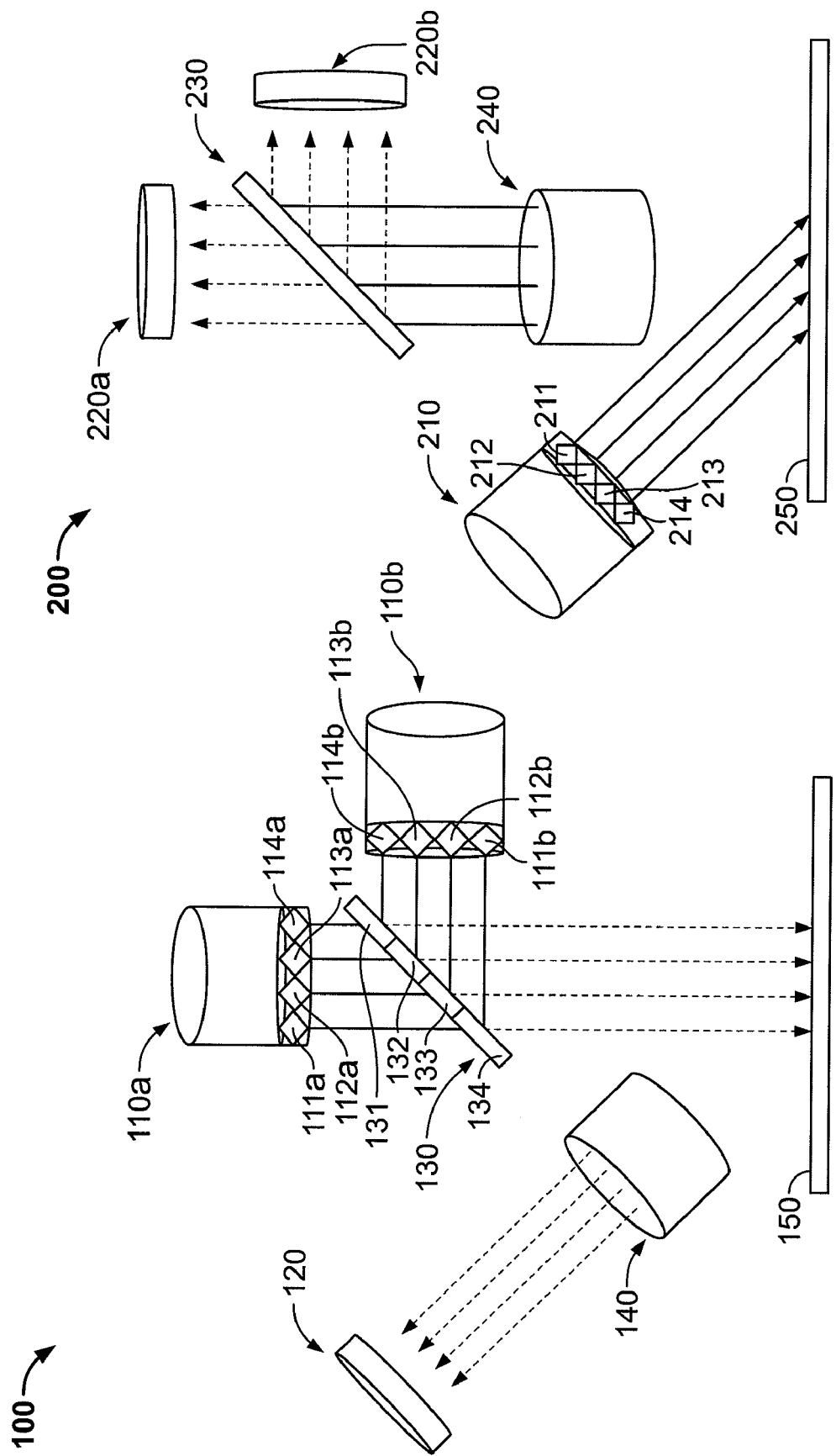

OPTICAL ASSEMBLIES FOR A COLOR MEASUREMENT INSTRUMENT

BACKGROUND

1. Technical Field

The present disclosure relates to optical assemblies for spectral imaging. More particularly, the present disclosure relates to optical assemblies and methods for improving spectral resolution of a color measurement instrument.

2. Background Art

For many manufacturing processes, color quality control is key. Thus, expensive high precision spectrophotometers have been used to "sample" colors of both manufacturing components and finished products. Preferably, color sampling is conducted "on-line" or "on-site," i.e., in cooperation with a manufacturing process. The benefit of "on line" color sampling is two fold: (1) "on-line" color sampling advantageously enables a more comprehensive inspection of a product line; and (2) "on-line" color sampling facilitates quicker, more effective corrective action, reducing both wasted time and materials. In many instances, manufacturers also advantageously utilize handheld spectrophotometers, e.g., to facilitate mobile/user-driven color sampling.

Due to the nature of manufacturing, "on-line" and handheld spectrophotometers are often exposed to hostile work environments, e.g., auto body shops, construction sites, etc. Thus, a clear need exists for robust inexpensive "on-line" and handheld color measurement systems that are capable of surviving and functioning in such work environments. More particularly, a need exists for "on-line" and handheld spectrophotometers that provide consistently precise color measurements irrespective of temperature variations, shock/vibrations, exposure to particulate or liquid contaminates, etc. Ideally, the sensor technology employed must be very cost effective—essentially to the point where the instrument is relatively expendable—in order to justify deployment in harsh and destructive environments. The difficulty, however, is achieving the desired robustness and cost while maintaining superior spectral resolution and accuracy.

Existing approaches to low-cost industrial color measurement typically utilize one of two general optical configurations: (1) wide-band (i.e., white light) illumination with narrow-band sensing, and (2) narrow-band (i.e., chromatic) illumination with wide-band sensing. A common implementation of the first approach is exemplified by a pulsed xenon illumination source opposite a plurality of spectrally-filtered photodiodes. A common implementation of the second approach is exemplified by a plurality of sequentially pulsing high brightness narrow-band LEDs opposite a simple wide band sensor. The above approaches advantageously strive to increase precision by minimizing the adverse affects of ambient lighting, i.e., via using high intensity illumination and/or differential color measurement.

In considering the above configurations, it is noted that LEDs are rapidly becoming a preferred means of illumination. LEDs are small, relatively inexpensive, energy efficient, bright and durable. Moreover, LEDs provide promising opportunities for further optimization, particularly in the areas of packaging, spectral coverage, and efficiency. LED costs have decreased dramatically and predictably as automation and economies of scale have been applied in the fabrication process. Furthermore, whereas LEDs were originally unable to generate the entire range of colors in the visual spectrum, recent material discoveries and evolutions in the manufacturing process have closed such gaps in LED spectral coverage.

In particular, LEDs offer two distinct advantages over incandescent illumination sources. First, LEDs are capable of emitting light at specific wavelength bands, whereas incandescent light sources require association with optical filters (optical filters are costly and reduce the overall efficiency of the light source). Secondly, unlike incandescent light sources, LEDs are current-driven devices with near instantaneous response times. Thus, the current used to power an LED may be advantageously modulated, e.g., at extremely high frequencies (approximately 1 MHz). As taught in U.S. Pat. No. 6,888,633, entitled "Color Measurement Instrument with Modulated Illumination," this capacity for frequency modulation may be exploited, e.g., to enhance both the selectivity and sensitivity of the color measurement instrument.

With regard to selectivity, frequency modulation may be used to advantageously distinguish a given light source from ambient light conditions and/or other light sources. In other words, if an LED is modulated at frequency X, the detector may be configured to respond ONLY to light modulated at frequency X. Thus, a wide-band sensor may be used to isolate and detect light originating from a specific LED and having a relatively narrow spectral output. Wide spectral coverage may be advantageously obtained, e.g., by modulating several LEDs, sequentially or concurrently, and later extracting each individual LED sub-signal from the detected signal based on a corresponding modulation "signature." Thus, a single wide-band sensor may be used to simultaneously measure a plurality of LED channels.

With regard to sensitivity, the above described frequency modulation limits the signal of interest to one or more sub-signals having predetermined frequency(s). Detection/amplification techniques may take advantage of this property to optimize the signal-to-noise ratio for the extracted sub-signals based on the known frequency component(s) thereof (see, e.g., U.S. Pat. No. 7,092,097, entitled "Color Measurement Instrument," regarding improving the signal to noise ratio and overall sensitivity of an LED-based color measurement instrument using auto-zeroing at the sensor diode). Thus, whereas conventional measurements of non-modulated light are sensitive to signal processing artifacts, such as voltage offsets, stray currents, thermal drift, and random and spurious forms of electronic noise, frequency modulation enables narrow-band detection/amplification of the corresponding sub-signals which can filter, avoid, or submerge such artifacts. Accordingly, frequency modulation techniques may advantageously improve the stability of color measurements and expand the dynamic range of instrumentation based on such measurements.

Despite efforts to date, however, there remains a need for improved optical assemblies which provide greater spectral resolution in hostile work environments (greater spectral resolution enabling, e.g., detection of metameric and high chroma samples). More particularly, a need exists for improved optical assemblies that maximize the spectral resolution of a color measurement instrument, e.g., a color measurement instrument employing multi-band chromatic (LED-based) illumination. These and other needs are satisfied by optical assemblies of the present disclosure.

SUMMARY

Optical assemblies are provided according to the present disclosure for improving spectral resolution of a chromatic illumination-based color measurement instrument. The optical assemblies disclosed herein advantageously utilize a beamsplitting unit/apparatus in association with either (i) the illumination path or (ii) the collection path of a color measurement instrument. Selection of a preferred implementation according to the present disclosure is largely dependent on the economics involved, e.g., based on a comparison of the cost of the illumination source vs. the cost of the detector. Packaging constraints may also impact preferred implementations for a specific application. Implementations involving both the illumination path and the collection path of a color measurement instrument are discussed and claimed herein.

Illumination Path: For exemplary implementations involving the illumination path of the color measurement instrument, the beamsplitting unit/apparatus may be configured to spectrally divide one or more initial beams of light so as to emit a plurality of resultant beams of light, wherein the optical assembly is configured to illuminate a target using at least a first and a second of the plurality of resultant beams of light, and wherein each of the first and second resultant beams of light is a product of a distinct set of one or more spectral constraints exacted by the beamsplitting unit/apparatus on one of the one or more initial beams of light.

Collection Path: For exemplary implementations involving the collection path of a color measurement instrument, the beamsplitting unit/apparatus may be configured to spectrally divide light received from a target so as to emit a plurality of resultant beams of light, wherein the optical assembly is configured to detect at least a first and a second of the plurality of resultant beams of light, and wherein each of the first and second resultant beams of light is a product of a distinct set of one or more spectral constraints exacted by the beamsplitting unit/apparatus on one of the received light.

In either case, the first and second resultant beams of light are typically products of opposite sets of spectral-constraints exacted by the beamsplitting unit/apparatus. Thus, the first resultant beam of light may be a product of a first set of spectral constraints exacted via transmittance by the beamsplitting unit/apparatus and the second resultant beam of light may be a product of a second and opposite set of spectral constraints exacted via reflectance by the beamsplitting unit/apparatus. Generally, the beamsplitting unit/apparatus is configured to produce a plurality of resultant beams of light by dividing each spectral band of a set of one or more spectral bands characterizing either the one or more initial beams of light (for the illumination path implementation) or the received light (for the collection path implementation). Thus, the beamsplitting apparatus may include a multi-edge dichroic beamsplitter configured such that each rising and falling edge of each pass-band of the multi-band dichroic beamsplitter bisects a corresponding spectral band of the set of one or more spectral bands.

Additional information regarding chromatic illumination can be found in U.S. Pat. Nos. 6,888,633, 7,092,097, 7,145,657 and 7,262,853, which are hereby incorporated by reference, in their entireties. Examples of color measurement instruments employing multi-band chromatic illumination include VeriColor™, VeriColor™ Solo and Matchstik™ instruments available from X-Rite, Inc. (Grand Rapics, Mich.)

As described herein, the disclosed optical assemblies may be used to effectively double the spectral resolution of a conventional chromatic illumination-based color measurement instrument. Additional features, functions and benefits of the disclosed assemblies and methods will be apparent from the description which follows, particularly when read in conjunction with the appended figures.

BRIEF DESCRIPTION OF THE DRAWINGS

To assist those of ordinary skill in the art in making and using the disclosed optical assemblies, reference is made to the appended figures, wherein:

FIG. 1 depicts an exemplary optical assembly for a color measurement instrument, including a beamsplitting unit/apparatus in the illumination path of the color measurement instrument.

FIG. 2 depicts an exemplary optical assembly for a color measurement instrument, including a beamsplitting unit/apparatus in the collection path of the color measurement instrument.

DESCRIPTION OF EXEMPLARY EMBODIMENT(S)

Figure 3:
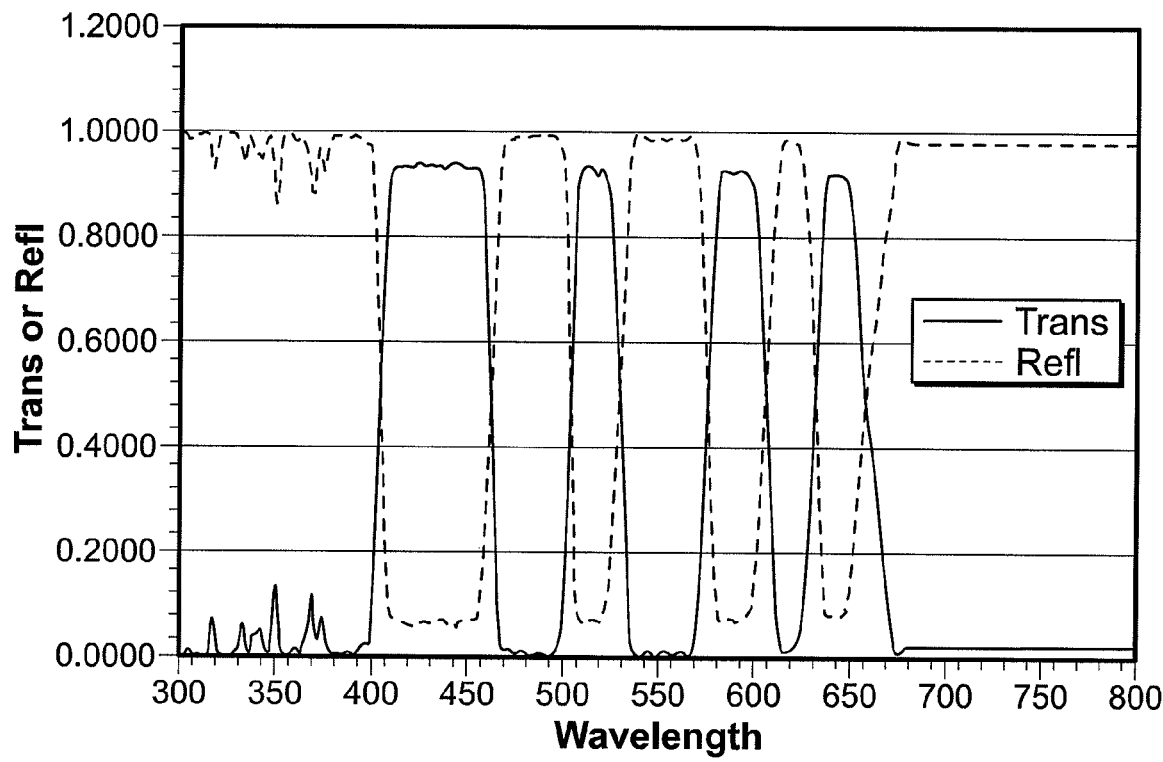
FIG. 3 depicts an exemplary response (transmittance and reflectance) for a four-band dichroic beamsplitter.

Referring now to FIG. 1, an exemplary optical assembly 100 for a color measurement instrument is depicted, the optical assembly 100 advantageously including a beamsplitting unit/apparatus 130 in association with an illumination path of the color measurement instrument. In general, the beamsplitting apparatus 130 is configured to spectrally divide one or more initial beams of light so as to emit a plurality of resultant beams of light, wherein the optical assembly 100 is configured to illuminate a target 150 using at least a first and a second of the plurality of resultant beams of light, and wherein each of the first and second resultant beams of light is a product of a distinct set of one or more spectral constraints exacted by the beamsplitting apparatus 130 on one of the initial beams of light. The optical assembly 100 may further include collector optics 140, e.g., for collecting light reflected by or transmitted through the target 150 and a detector, e.g., a wideband detector 120, for detecting the collected light.

As depicted in FIG. 1, the first resultant beam of light may be the product of a first set of spectral constraints exacted on an initial beam of light via transmittance by the beamsplitting apparatus 130. Similarly, the second resultant beam of light may be the product of a second (e.g., opposite) set of spectral constraints exacted on an initial beam of light via reflectance by the beamsplitting apparatus 130. It is noted, however, that while, in the exemplary embodiment depicted in FIG. 1, the first and second resultant beams of light consist of light transmitted by the beamsplitting apparatus 130 and light reflected by the beamsplitting apparatus 130, respectively, the present disclosure is not limited to such means for spectrally dividing the one or more initial beams of light. Indeed, it is appreciated that the particular means by which the beamsplitting apparatus 130 divides the one or more initial beams of light and emits the first and second resultant beams of light may vary (for example, a beamsplitting unit/apparatus employing a prism means for dividing the one or more initial beams of light may emit the first resultant beam at a first refraction/reflection angle and the second resultant beam at a second refraction/reflection angle).

In exemplary embodiments, the first and second resultant beams of light may be the product of first and second sets of spectral constraints exacted by the beamsplitting apparatus 130 on first and second initial beams of light. Thus, in exemplary embodiments, the optical assembly 100 may include first and second chromatic illumination sources 110a and 110b for producing the first and second initial beams of light. Alternatively, the first and second initial beams of light may be produced by a single chromatic illumination source associated with an appropriate relay apparatus configured to divide and direct light originating from the single chromatic illumination source into the first and second initial beams of light. Note that temporal and/or other means for distinguishing, e.g., between the first and second initial beams are later provided herein.

In exemplary embodiments, the optical assembly 100 may be configured such that the first initial beam of light (e.g., produced by the first chromatic illumination source 110a) impinges a first side of the beamsplitting apparatus 130 and the second initial beam of light (e.g., produced by the second chromatic illumination source 110b) impinges a second (e.g., opposite) side of the beamsplitting apparatus 130. Thus, the first and second initial beams of light may be oriented relative to the beamsplitting apparatus 130 such that the first resultant beam of light (e.g., wavelengths of the first initial beam of light transmitted by the beamsplitting apparatus 130) and the second resultant beam of light (e.g., wavelengths of the second initial beam reflected/refracted by the beamsplitting apparatus 130) are directed along a same optical path, e.g., toward the target 150 at the desired angle of incidence relative thereto (e.g. 90°). Thus, for the exemplary embodiment depicted in FIG. 1, the optical assembly 100 is configured such that the first initial beam of light produced by the first chromatic illumination source 110a and the second initial beam of light produced by the second chromatic illumination source 110b impinge opposite parallel surfaces of the beamsplitting apparatus 130 at mirroring angles of incidence (e.g., 45°). Alternatively, the beamsplitting apparatus 130 may be associated with an appropriate relay apparatus configured to the first and second resultant beams of light direct light originating from the single chromatic illumination source into the first and second initial beams of light toward the target 150 at desired angles of incidence. Again note that temporal and/or other means for distinguishing, e.g., between the first and second resultant beams are later provided herein.

With reference still to FIG. 1, the chromatic illumination sources 110a and 110b may each include a plurality of narrow-band illuminators (e.g., LEDs 111a, 112a, 113a and 114a and LEDs 111b, 112b, 113b and 114b, respectively). In exemplary embodiments, the chromatic illumination sources 110a and 110b may include (spectrally) identical pluralities of narrow-band illuminators. Thus, the initial beams of light may be characterized by identical sets of one or more spectral bands, wherein, for example, each spectral band corresponds to a pair of narrow-band illuminators (e.g., LEDs 111a and 111b, LEDs 112a and 112b, etc.). According to the present disclosure, the narrow-band illuminators may be uniquely modulated and/or sequentially pulsed to facilitate independent detection thereof, e.g., utilizing a wideband detector (e.g., detector 120). Thus, in exemplary embodiments, each narrow-band illuminator or at least one of each pair of narrow-band illuminators may be uniquely modulated to enable independent detection of each corresponding spectral band. The chromatic illumination sources 110a and 110b may also be sequentially pulsed to allow for synchronized detection of thereof. Alternatively, the beamsplitting apparatus 130 may be associated with an appropriate relay apparatus configured to modulate/sequence, e.g., via temporal, phase and/or polarization adjustments, at least one of the first and second initial beams of light or at least one of the first and second resultant beams of light, thereby allowing for independent detection of each of the first and second resultant beams of light.

The disclosed beamsplitting apparatus 130 may be advantageously configured to divide, e.g., bisect, trisect, etc., each spectral band of a same set of spectral bands characterizing the one or more initial beams of light, thereby producing the plurality of resultant beams of light. Thus, in exemplary embodiments, the beamsplitting apparatus 130, may include a multi-edge dichroic beamsplitter. The multi-edge dichroic beamsplitter may be advantageously configured/tuned such that each rising and falling edge of each pass-band of the multi-band dichroic beamsplitter bisects a corresponding spectral band of the same set of spectral bands characterizing the one or more initial beams of lights. Alternatively, the beamsplitting apparatus 130 may include a plurality of single-edge beamsplitters, e.g., beamsplitters 131, 132, 133 and 134, each configured such that the single-edge bisects a corresponding spectral band of the same set of spectral bands characterizing the one or more initial beams of lights. Thus, a light tube array or other optical constraint may be employed to isolate and direct each spectral band of each of the one or more initial bands of light (e.g., isolate and direct light from each narrow-band illuminator) to the corresponding single-edge beamsplitter.

Referring now to FIG. 2, an exemplary optical assembly 200 for a color measurement instrument is depicted, the optical assembly 200 advantageously including a beamsplitting apparatus 230 in association with a collection path of the color measurement instrument. In general, the beamsplitting apparatus 230 is configured to receive light from a target (e.g., light reflected by or transmitted through a target 250 and collected by collection optics 240) and spectrally divide the received light so as to emit a plurality of resultant beams of light, wherein the optical assembly 200 is configured to detect, e.g., using a plurality of wide-band detectors 220a and 220b, at least a first and a second of the plurality of resultant beams of light, wherein each of the first and second resultant beams of light is a product of a distinct set of one or more spectral constraints exacted by the beamsplitting apparatus 230 on the received light.

Referring to the exemplary embodiment depicted in FIG. 2, the first resultant beam of light may be the product of a first set of spectral constraints exacted on the received light via transmission thereof through the beamsplitting apparatus 230. Similarly, the second resultant beam of light may be the product of a second (e.g., opposite) set of spectral constraints exacted on the received light via reflection thereof by the beamsplitting apparatus 230. It is noted, however, that while, in the exemplary embodiment depicted in FIG. 2, the first and second resultant beams of light consist of light transmitted by the beamsplitting apparatus 230 and light reflected by the beamsplitting apparatus 230, respectively, the present disclosure is not limited to such means for spectrally dividing the received light. Indeed, it is appreciated that the particular means by which the beamsplitting apparatus 230 divides the received light and emits the first and second resultant beams of light may vary (for example, a beamsplitting apparatus employing a prism means for dividing the received light may emit the first resultant beam at a first refraction/reflection angle and the second resultant beam at a second refraction/reflection angle).

According to the present disclosure, the beamsplitting unit/apparatus 230 may be advantageously configured to spectrally divide, e.g., bisect, trisect, etc., each spectral band of a set of one or more spectral bands characterizing the received light, thereby producing the plurality of resultant beams of light. Thus, in exemplary embodiments, the beamsplitting apparatus 230, may include a multi-edge dichroic beamsplitter. The multi-edge dichroic beamsplitter may be advantageously configured/tuned such that each rising and falling edge of each pass-band of the multi-band dichroic beamsplitter divides (e.g., bisects) a corresponding spectral band of the set of spectral bands characterizing the received light.

With reference still to FIG. 2, the optical assembly 200 may include a chromatic illumination source 210 for illuminating the target 250. The chromatic illumination source 210 may include a plurality of narrow-band illuminators (e.g., LEDs 211, 212, 213 and 214), wherein each of the narrow-band illuminators corresponds to one of the one or more spectral bands characterizing the received light. According to the present disclosure, the narrow-band illuminators may be uniquely modulated and/or sequentially pulsed to facilitate independent detection of each corresponding spectral band, e.g., utilizing a wideband detector (e.g., detectors 220a and 220b).

Referring now to both FIGS. 1 and 2 it is noted that while the exemplary optical assemblies 100, 200 represent 0°/45° and 45°/0° measurement configurations, respectively, it is noted that the present disclosure is not limited to such embodiments. Indeed, as would be apparent to one skilled in the art, the optical assemblies 100, 200 may be adapted for any measurement configuration including but not limited to, 0°/45°, 45°/0°, Sphere, transmission and multi-angle measurement configurations.

Referring now to FIG. 3, a typical multi-edge dichroic beamsplitter response (transmittance and reflectance) is depicted. As described above, a multi-edge dichroic beamsplitter may be advantageously configured/tuned such that each rising edge and each falling edge of each pass-band of the multi-band dichroic beamsplitter divides (e.g., bisects) a corresponding spectral band of a set of spectral bands characterizing light received by the beamsplitter. Thus, as depicted in FIG. 4, the multi-band dichroic beamsplitter is configured/tuned such that each rising edge and each falling edge of each pass-band bisects a spectral band corresponding to one of a plurality of narrow-band illuminators (LEDs 1-8) used to illuminate a target.

Figure 4:
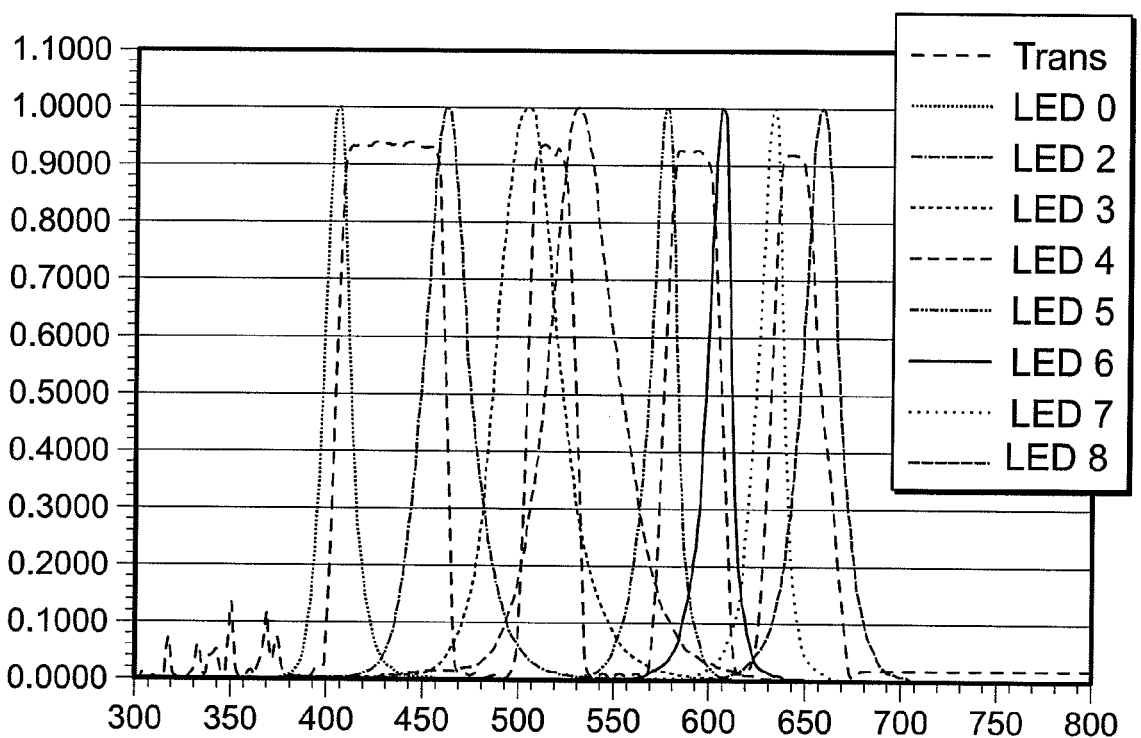
FIG. 4 depicts configuring/tuning the four-band dichroic beamsplitter of FIG. 3 for inclusion thereof in the collection path of an 8-LED color measurement instrument.
Figure 5:
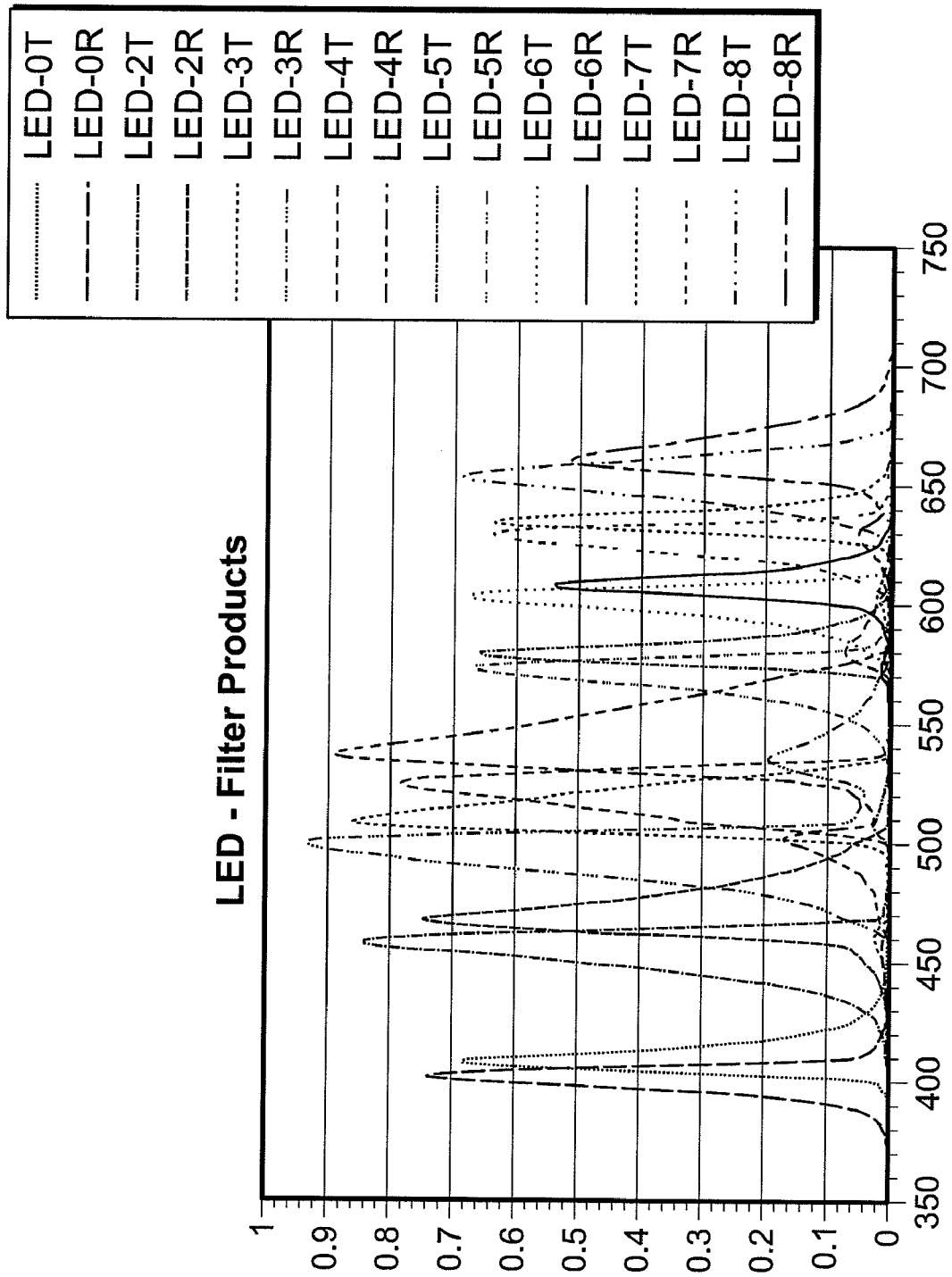
FIG. 5 depicts a detectable spectrum for each of light reflected and light transmitted by the multi-band dichroic beamsplitter of FIG. 3.

FIG. 5, depicts a detectable spectrum for each of light reflected and light transmitted by the multi-band dichroic beamsplitter of FIGS. 3 and 4. Thus, for the 8-LED embodiment depicted, a total of 16 independently detectable spectral bands (i.e., 16 channels) are achieved. Because FWHM spectral bandwidth for most chromatic epitaxial HB-LEDs is in the range of 20 to 30 nm, the resulting 16 channels are typically each characterized by a half-band product of approximately 10 to 15 nm. Notably, the steep slopes and sharp knees of multi band spectral filtration, combined with the relatively narrow Gaussian wavelength distribution of epitaxial HB-LEDs, advantageously maximize separation and independence of each channel. The present disclosure, however, is not limited to the 8-LED/16-channel solution described above. Indeed, many variations are possible and may be advantageous depending on the specific application.

As demonstrated below, the simple, robust, low cost, solid state solution of an 8-LED/16-channel color measurement instrument as described herein is particularly well suited for emulating a 16 point spectrophotometer. Tables 1 and 2 (below) provide performance evaluations (based on BCRA ceramic color standards) for each of (i) a conventional 8-LED instrument, and (ii) an 8-LED+four-band dichroic beamsplitter instrument, respectively, as compared to a Laboratory 10 nm spectrophotometer CE7000A.

TABLE 1

(Conventional 8-LED Instrument)

| Name | $DL^x$ | $Da^x$ | $Db^x$ | DE |
|---|---|---|---|---|
| White | −.04 | −.14 | .25 | .29 |
| Lt Gray | −.04 | −.10 | .17 | .20 |
| Mid Gray | −.05 | −.14 | .22 | .27 |
| Diff Gray | −.10 | .16 | −.03 | .20 |
| Dark Gray | −.06 | .02 | −.06 | .09 |
| Pink | .35 | −1.43 | .51 | 1.55 |
| Red | .38 | −1.11 | .33 | 1.22 |
| Orange | 1.78 | −5.10 | 2.41 | 5.91 |
| Yellow | −.59 | 1.13 | −2.18 | 2.53 |
| Green | −.68 | 2.72 | −1.52 | 3.19 |
| Diff Green | −.72 | 2.79 | −1.72 | 3.36 |
| Cyan | .06 | −.33 | .97 | 1.03 |
| Dark Blue | .16 | −2.20 | .78 | 2.34 |
| avgDE |  |  |  | 1.71 |

TABLE 2

(8-LED + Four-Band Dichroic Beamsplitter Instrument)

| Name | $DL^x$ | $Da^x$ | $Db^x$ | DE |
|---|---|---|---|---|
| White | .00 | −.04 | −.03 | .05 |
| Lt Gray | .00 | −.05 | .02 | .06 |
| Mid Gray | .00 | −.05 | .01 | .05 |
| Diff Gray | .00 | −.06 | .00 | .06 |
| Dark Gray | −.01 | −.08 | −.02 | .08 |
| Pink | −.04 | −.34 | −.08 | .35 |
| Red | −.07 | −.55 | −.14 | .58 |
| Orange | .10 | −.02 | .57 | .58 |
| Yellow | .05 | −.17 | −.14 | .22 |
| Green | .05 | −.26 | −.10 | .28 |
| Diff Green | .05 | −.27 | −.10 | .29 |
| Cyan | −.04 | −.05 | −.05 | .08 |
| Dark Blue | −.02 | −.17 | −.25 | .30 |
| avgDE |  |  |  | .23 |

Notably, a dramatic reduction in average and maximum color error was observed for the 8-LED+four-band dichroic beamsplitter instrument. Indeed, a 7:1 reduction in average color error was observed across the BCRA color set. Similarly, a 10:1 reduction in maximum color error was observed for the orange color tile.

Figure 6:
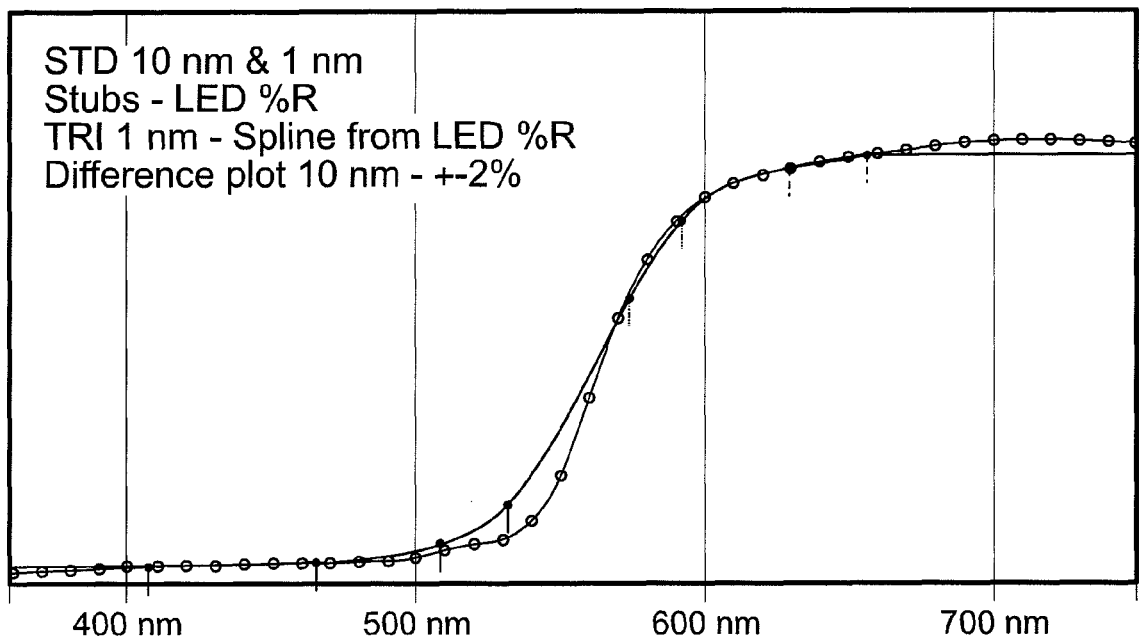
FIGS. 6-7 depict a response across the visible spectrum (400 nm to 700 nm) to an orange color tile (BCRA ceramic color standard) for each of (i) a conventional 8-LED color measurement instrument, and (ii) an 8-LED+four-band dichroic beamsplitter instrument, respectively, as compared to a Laboratory 10 nm spectrophotometer CE7000A.
Figure 7:
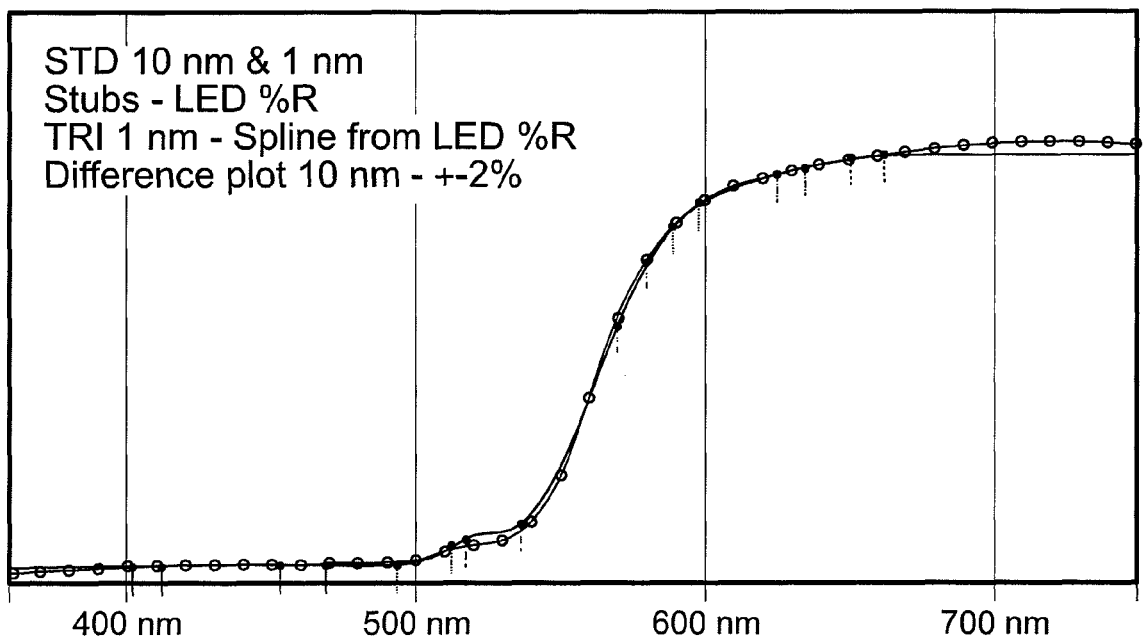

FIGS. 6 and 7 depict a response across the visible spectrum (400 nm to 700 nm) to the orange color tile for each of (i) the conventional 8-LED instrument and (ii) the 8-LED+four-band dichroic beamsplitter instrument, respectively, as compared to the Laboratory 10 nm spectrophotometer CE7000A. Notably, the 8-LED+four-band dichroic beamsplitter instrument exhibited improved performance, particularly between 500-600 nm where eye sensitivity to hue and chroma and dE calculations of color error are most sensitive.

Although the present disclosure has been described with reference to exemplary embodiments and implementations thereof, the disclosed optical assemblies are not limited to such exemplary embodiments/implementations. Rather, as will be readily apparent to persons skilled in the art from the description provided herein, the disclosed optical assemblies are susceptible to modifications, alterations and enhancements without departing from the spirit or scope of the present disclosure. Accordingly, the present disclosure expressly encompasses such modification, alterations and enhancements within the scope hereof.

What is claimed:

1. An optical assembly for a color measurement instrument, said optical assembly comprising:
   one beamsplitting apparatus in association with an illumination path of a color measurement instrument and configured to spectrally divide one or more initial beams of light so as to emit a plurality of individual resultant beams of light,
   wherein the optical assembly is configured to illuminate a target using at least a first and a second of the plurality of individual resultant beams of light, and
   wherein each of the first and second resultant beams of light is a product of a distinct set of one or more spectral constraints exacted by the one beamsplitting apparatus on one of the one or more initial beams of light.

2. The optical assembly of claim 1, further comprising collector optics for collecting light reflected by or transmitted through the target and a wide-band detector for detecting the collected light.

3. The optical assembly of claim 1, wherein the first and second resultant beams of light are products of opposite sets of spectral-constraints exacted by the one beamsplitting apparatus.

4. The optical assembly of claim 3, wherein the first resultant beam of light is a product of a first set of spectral constraints exacted via transmittance by the one beamsplitting apparatus and wherein the second resultant beam of light is a product of a second and opposite set of spectral constraints exacted via reflectance by the one beamsplitting apparatus.

5. The optical assembly of claim 1, wherein the first and second resultant beams of light are products of first and second sets of spectral constraints exacted by the one beamsplitting apparatus on first and second initial beams of light, respectively.

6. The optical assembly of claim 5, further comprising first and second chromatic illumination sources for producing the first and second initial beams of light.

7. The optical assembly of claim 6, wherein each of the chromatic illuminations sources includes a spectrally identical plurality of narrow-band illuminators.

8. The optical assembly of claim 7, wherein each narrow-band illuminators is uniquely modulated and/or sequenced to facilitate independent detection of a spectral band corresponding to each narrow-band illuminator using a wide-band detector.

9. The optical assembly of claim 5, wherein the optical assembly is configured such that the first initial beam of light impinges a first side of the one beamsplitting apparatus and the second initial beam of light impinges a second side of the one beamsplitting apparatus.

10. The optical assembly of claim 5, wherein the first and second initial beams of light are oriented relative to the one beamsplitting apparatus such that the first and second resultant beams of light are directed along a same optical path.

11. The optical assembly of claim 10, wherein the first set of spectral constraints is exacted via transmittance by the one beamsplitting apparatus and the second set of spectral constraints is exacted via reflectance by the one beamsplitting apparatus and wherein the first and second initial beams of light impinge opposite parallel surfaces of the one beamsplitting apparatus at mirroring angles of incidence.

12. The optical assembly of claim 1, wherein the one beamsplitting apparatus is configured to divide each spectral band of a same set of one or more spectral bands characterizing the one or more initial beams of light, thereby producing the plurality of resultant beams of light.

13. The optical assembly of claim 12, wherein the one beamsplitting apparatus includes a multi-edge dichroic beamsplitter configured such that each rising and falling edge of each pass-band of the multi-band dichroic beamsplitter bisects a corresponding spectral band of the same set of one or more spectral bands characterizing the one or more initial beams of lights.

14. An optical assembly for a color measurement instrument, said optical assembly comprising:
   a beamsplitting apparatus in association with a collection path of a color measurement instrument and configured to spectrally divide light received from a target so as to emit a plurality of resultant beams of light,
   wherein the optical assembly is configured to detect at least a first and a second of the plurality of resultant beams of light,
   wherein each of the first and second resultant beams of light is a product of a distinct set of one or more spectral constraints exacted by the beamsplitting apparatus on one of the received light, and
   wherein the beamsplitting apparatus includes a multi-edge dichroic beamsplitter configured such that each rising and falling edge of each pass-band of the multi-band dichroic beamsplitter bisects a corresponding spectral band of the set of spectral bands characterizing the received light.

15. The optical assembly of claim 14, further comprising first and second wide-band detectors for detecting the first and second resultant beams of lights.

16. The optical assembly of claim 14, wherein the first and second resultant beams of light are products of opposite sets of spectral-constraints exacted by the beamsplitting apparatus.

17. The optical assembly of claim 16, wherein the first resultant beam of light is a product of a first set of spectral constraints exacted via transmittance by the beamsplitting apparatus and wherein the second resultant beam of light is a product of a second and opposite set of spectral constraints exacted via reflectance by the beamsplitting apparatus.

18. The optical assembly of claim 14, wherein beamsplitting apparatus is configured to divide each spectral band of a set of one or more spectral bands characterizing the received light, thereby producing the plurality of resultant beams of light.

19. The optical assembly of claim 14, wherein the spectral bandwidth for each of the spectral bands characterizing the received light is between 20 to 30 nm and wherein the spectral bandwidth for each spectral band characterizing the first or second resultant beams of light is between 10-15 nm.

20. The optical assembly of claim 18 further comprising a chromatic illumination source for illuminating the target, the chromatic illumination source including a plurality of narrow-band illuminators, wherein each of the narrow- band illuminators corresponds to one of the one or more spectral bands characterizing the received light.

21. The optical assembly of claim 20, wherein each narrow-band illuminator is uniquely modulated and/or sequenced to facilitate independent detection of the corresponding spectral band using a wide-band detector.

* * * * *